May 24, 1966 C. R. ECKARDT ETAL 3,252,502
CENTRIFUGAL WIPED FILM EVAPORATION PROCESS FOR VISCOUS MATERIALS
Filed Jan. 19, 1962 2 Sheets-Sheet 1

INVENTORS:
CARL R. ECKARDT
HOWARD L. PAYNTAR
BY
*George B. Campbell*
ATTORNEY

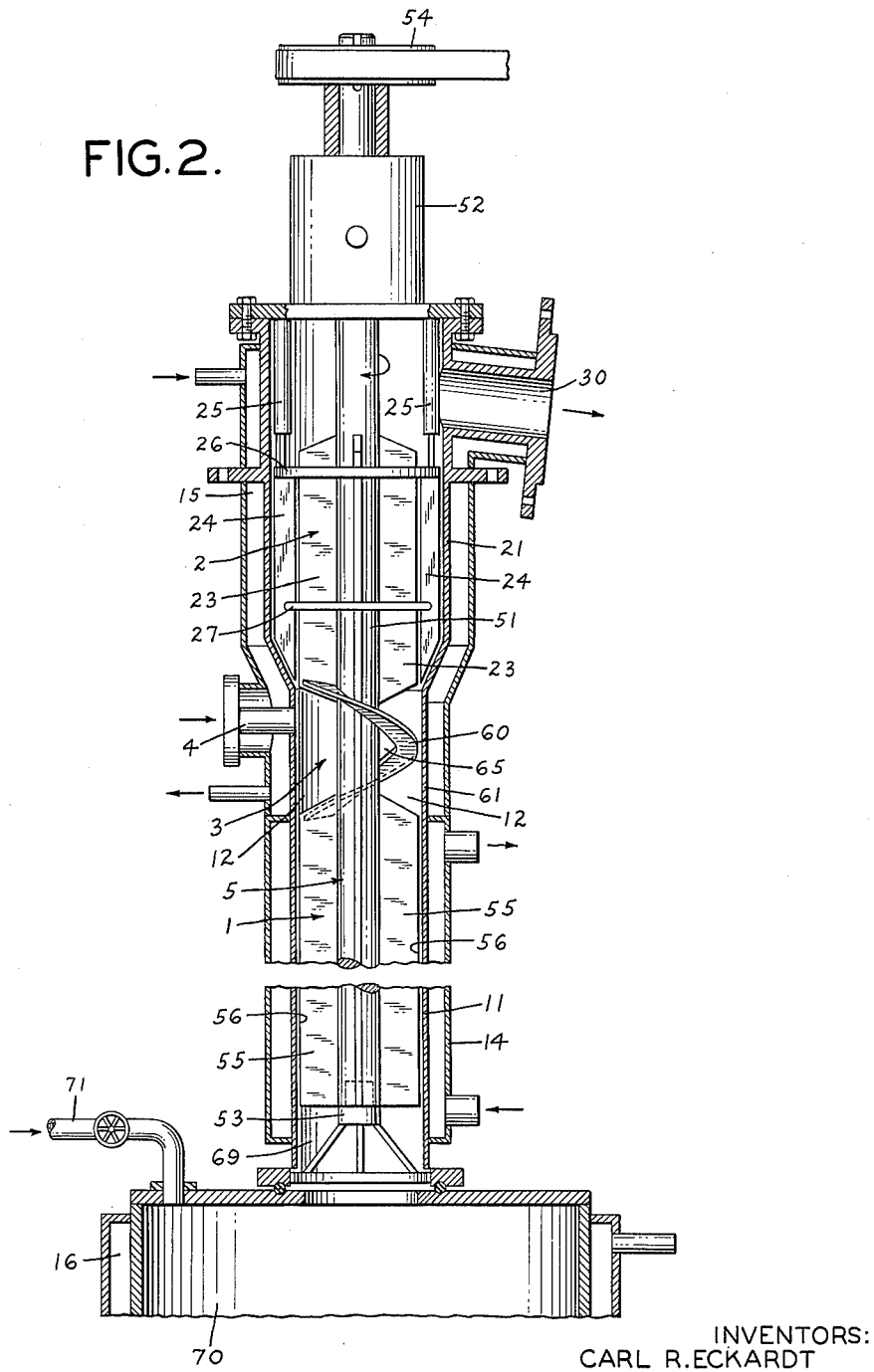

3,252,502
CENTRIFUGAL WIPED FILM EVAPORATION PROCESS FOR VISCOUS MATERIALS
Carl R. Eckardt, Morris Plains, and Howard L. Payntar, Madison, N.J., assignors to Allied Chemical Corporation, New York, N.Y., a corporation of New York
Filed Jan. 19, 1962, Ser. No. 167,260
1 Claim. (Cl. 159—49)

This invention relates to improvements in processes and apparatus for the separation, by evaporation, of more volatile components from less volatile components of liquid material or materials which are liquid under the evaporation conditions. It relates more particularly to evaporator apparatus and evaporation processes wherein a falling film of liquid to be evaporated is subjected to agitation in a thin layer over the entire area of a heat transfer surface, so as to produce agitation in the layer of liquid undergoing evaporation. It relates especially to improvements in such evaporator apparatus and processes whereby difficulties due to the viscous nature of the liquid materials can be overcome, particularly in connection with evaporation under vacuum conditions.

Various processes and apparatus are known for the separation by evaporation of more volatile components from less volatile components of liquid materials or materials which are liquid under the conditions of evaporation. In accordance with one process, evaporation is secured by flowing the liquid or liquefied material, from which a more volatile component is to be removed by evaporation, in the form of a falling thin film in contact with a heated surface while being subjected to conditions of agitation by means of agitators operating in close proximity to the heated surface, and the resulting vapor liberated by the evaporation is withdrawn from the heated surface countercurrent to the falling film through a separator chamber where entrained liquid is removed by contact with similar agitators. In the practice of processes of this type, the material to be subjected to evaporation is introduced into the apparatus at a point between the heated evaporator surface and the separator chamber, which is positioned above the evaporator chamber and directly connected thereto.

In the evaporation of many materials, and especially in the evaporation of viscous materials under vacuum conditions, difficulty has heretofore been encountered due to foaming, which leads to clogging of the separation chamber and even interferes with the operation of the agitators.

For example, the separation of monomers, oligomers and other volatile material from polymeric material obtained by polymerization of monomers, presents difficulties due to the viscous nature of the polymeric material subjected to evaporation and the necessity of using vacuum conditions to avoid overheating and decomposition. As an instance, the removal of water-extractable substances from nylon-6 polymer may be cited.

Nylon-6 polymer obtained by the polymerization of epsilon-caprolactam in the presence of water may contain 10–12% by weight of low molecular material, mainly monomeric epsilon-caprolactam together with some oligomers (dimers and trimers of epsilon-caprolactam). For satisfactory use of such polymers in many of the spinning and molding applications for which they are employed, it is desirable to remove some or all of the low molecular material particularly monomer, from the polymers. This can be accomplished by subjecting the polymer in the form of chips or other subdivided form to extraction with water; but such a procedure is not suitable for use in connection with continuous processes of polymerizing the caprolactam.

Various methods and forms of apparatus have been proposed for stripping low molecular material from such polymers before subjecting them to a fiber spinning operation.

Thus, in accordance with one system, the polymer is subjected to vacuum evaporation in the heads of the spinning chambers.

According to another system, the polymer is first stripped at an absolute pressure of 0.3–0.5 mm. Hg and a temperature of 260°–265° C. in a vacuum stripper consisting of two concentric heated chambers between which the polymer flows slowly into a compensation tank operating at atmospheric pressure, where it is held for three to four hours, after which the polymer is subjected to a second stage of vacuum stripping by heating it for an additional hour at 0.3–0.5 mm. Hg absolute pressure and 260° C. in a similar form of apparatus consisting of two concentric heated chambers.

If it is attempted to carry out the evaporation of the polymer material, and especially polycaprolactam obtained by polymerization of epsilon-caprolactam, in a form of evaporator capable of more rapid operation and in a continuous manner, such as an evaporator of the falling film type referred to above, wherein the film of liquid to be evaporated is subjected to agitation in a thin layer, mechanical difficulties and/or inefficient evaporation occur, due to foaming of the polymer. Owing to the speed of rotation of the agitator members, the effect of gravity is substantially counterbalanced by centrifugal force, with the result that molten polymer entering the feed supply chamber tends to accumulate there, and foam generated therefrom by the sudden decrease in pressure rises into the separator chamber, which operates at a lower temperature. Solidification of the polymer in the foam occurs in the separator chamber and interferes with the action of the separator and may even cause the agitator rotor to slow down or jam. Solidified polymer also blocks off the vapor outlet and interferes with full exhaustion of the monomer and other vapors being removed.

An object of the present invention is to provide an improved evaporation process and apparatus whereby the said difficulties and inefficiency can be overcome.

A further object of the present invention is to provide an improved evaporator of the agitated falling film type referred to above whereby foam which tends to rise into the separator chamber is dispersed and prevented from interfering with the effective operation of the apparatus.

Further objects of the present invention are to provide an improved process for separating low boiling material from caprolactam nylon and to accomplish this by an evaporation from the polymer in the form of an agitated falling film under vacuum or in contact with a current of inert gas which is substantially free of the low boiling material.

Another object of the present invention is to provide an improved continuous process and apparatus for coping effectively with foaming problems attending evaporation of caprolactam and water from caprolactam nylon under conditions of high vacuum; whereby rapid stripping may be achieved.

Other objects of the present invention will in part be obvious and will in part appear hereinafter.

We have discovered that the foregoing objects can be accomplished and the difficulties caused by highly viscous materials, and especially caprolactam nylon, when subjected to evaporation in the form of an agitated thin falling film in contact with a heated surface under conditions of high vacuum, can be overcome by subjecting the material to the foam-breaking action of a rotary means so disposed in the feed supply chamber as to provide positive downward displacement of released liquid while providing a substantially unobstructed path for the vapors.

The invention accordingly comprises the herein described process embodying the steps and their relation, and the apparatus embodying features of construction, combination of elements, and arrangement of parts, which are exemplified in the following detailed disclosure and illustrated in the accompanying drawings. The scope of the invention will be indicated in the claims.

For a fuller understanding of the nature and objects of the invention, reference should be had to the following description taken in connection with the accompanying drawings, in which FIG. 1 is an elevation of an apparatus embodying the invention, shown in section in FIG. 2.

Figure 1:
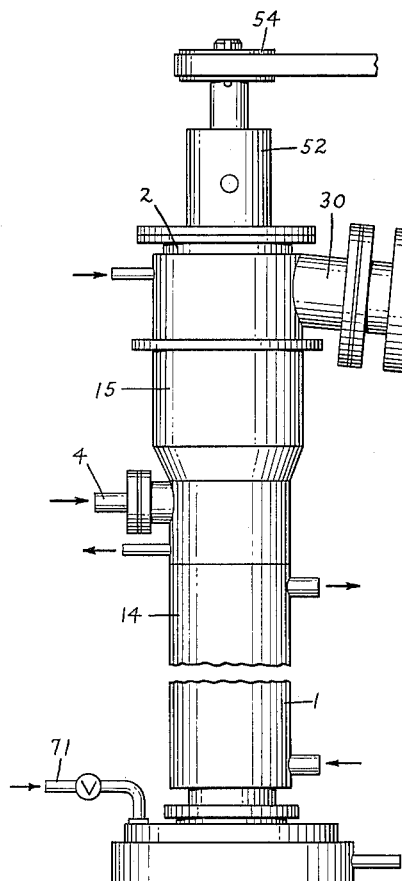
Figure 3:
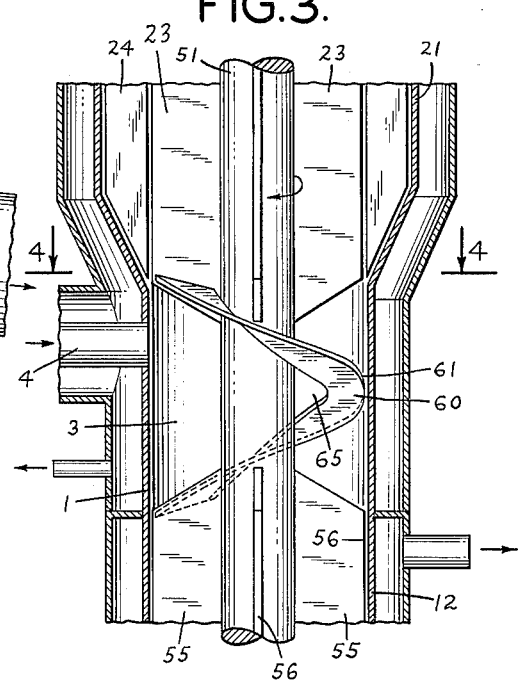
FIG. 3 is an enlarged sectional view of a portion of the apparatus showing the construction of the foam-breaking mechanism constituting a feature of the invention.
Figure 4:
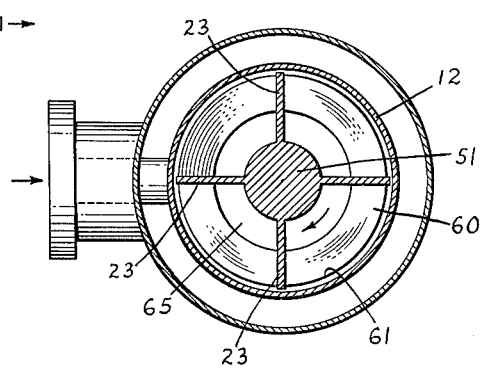
FIG. 4 is a horizontal section along the line 4—4 of FIG. 3.

Referring to the drawings, the apparatus comprises an evaporation chamber 1 and a separator chamber 2, formed as a continuation of the evaporation chamber and connected therewith by a feed-supply chamber 3 having a feed inlet 4. The evaporation chamber 1 is in the form of an elongated, substantially vertically disposed cylinder or tubular element 11 the inner surface 12 of which constitutes a heat transfer surface.

The chambers 1, 2 and 3 preferably have a common vertical axis and a rotary agitator 5 is mounted to rotate within the chambers 1, 2 and 3 on rotor shaft 51 mounted axially of said chambers in bearings 52 and 53, driven by suitable driving means 54.

The agitator 5 is formed of vertical blades 55, mounted on shaft 51, extending vertically substantially the full length of said evaporator chamber and terminating below the feed-supply chamber 3. The blades 55 are so constructed as to leave only small clearance between their outer edges 56 and the inner heat transfer surface 12, as discussed more fully below.

The evaporation chamber is provided with a heating jacket 14 for supplying the heat required to effect the desired evaporation at temperatures above the melting temperature of the material in the evaporating chamber. A separate heating jacket 15 is provided for chamber 3 and its feed inlet 4, and vapor outlet 30 and chamber 2 to provide the heat required to prevent solids forming in these portions of the apparatus.

The separator chamber 2 constitutes an expanded portion 21 of the tubular member 11 to provide for cooperating rotary vertical blades 23 and stationary vertical fins 24 which serve as liquid separators for liquid carried into chamber 2 by vapors generated in chamber 1.

The blades 23 are mounted on shaft 51 and rotate in concert with agitator blades 55. The fins 24 are secured to the interior of chamber 2 by suitable means, shown as rods 25 and annular braces 26 and 27, and terminate below a vapor outlet 30 of the chamber 2 and above the feed-supply chamber 3.

In order to prevent foam generated in the feed supply chamber 3 from rising into the separator chamber 2 and interfering with the operation of the evaporator, the apparatus is provided with mechanical means for breaking foam and positively displacing the foam-generating feed in the direction of the heated evaporation surface 12, while providing a substantially unobstructed path for the vapors passing from the evaporation chamber to the vapor outlet 30. In the preferred embodiment shown in the drawing, said means is in the form of a helical ribbon 60 mounted to rotate in the feed-supply chamber 3 in concert with the blades 55 and 23. In the embodiment shown in the drawing, it is secured at one end to an agitator blade 55 and at the other end to a separator blade 23. The helical ribbon is constructed and mounted so as to leave only a small clearance between its outer edge 61 and the inner surface 12 of the tubular element 11. The width of the helical ribbon is less than the radial distance between the rotor shaft 51 and the inner surface 12, so as to provide an unobstructed passage 65 between the rotor shaft 51 and the helical ribbon 60.

The vapor outlet 30 is connected to suitable condensing and recovery means which in turn may be connected to means for providing a high vacuum in the apparatus (not shown). Alternatively, means may be provided for introducing an inert gas into receiver 70 via inlet pipe 71.

The bottom portion of the evaporator section 1 is connected with receiver 70 for the material which has passed downward through the evaporator chamber. Preferably, for use in connection with highly viscous material, the outlet 69 of the chamber 1 is of substantially the same diameter as the tubular element 11, so as to prevent clogging of the outlet. Means, not shown in the drawing, are provided for withdrawing molten polymer from receiver 70 which is also provided with a heating jacket 16 to prevent the polymer from solidifying.

The apparatus is further connected to suitable feeding means (not shown) for feeding molten polymer through feed inlet 4 into feed-supply chamber 3, and to suitable discharge means for removing molten purified polymer from the receiver 70. Such means are conventional. For example, the said means may comprise extruder pumps of the rotary screw type.

In carrying out the process of the present invention in connection with apparatus of the type described above, the material to be evaporated is charged to the apparatus through inlet 4 by suitable charging means (not shown) and falls through the feed-supply chamber 3 into the evaporator chamber 1. There it is contacted by the agitator blades 55 which are rotated at a sufficiently high speed to move the material by the action of centrifugal force into contact with the inner surface 12 of the tubular element 11. The material forms a thin film substantially covering the entire inner surface 12. The action of the rotating blades 55 forces the material melt over the inner surface 12 of the heated evaporator section by centrifugal force, and simultaneously forms descending fillets of molten material on the leading edge 56 of each of the blades. The fillets rotate with the blade movement, imparting compressive and rotational force against the film of molten material at the heat transfer surface, causing the film to combine with the fillets, and the liquid material which is distributed evenly as a thin film descends along the surface traveling through the heated evaporation chamber of the evaporator in a short, controlled period of time.

The rotation of the agitator blades 55 in contact at their edges 56 with the film of material causes turbulence in said film and facilitates the heat transfer and removal of vapor. The centrifugal force imparted to any material separated from the surface acts to return that material to the film and thus maintain conditions of substantial continuity of the film falling over the heat transfer surface. Thus, the free surface of the film of material (the surface opposite that in contact with the heat transfer surface 12) is subjected to the agitating action of solid surfaces presenting a forward face adjacent to the film which is substantially perpendicular to the film surface and moves along the film surface transversely of the direction of the flow of the film. Under the action of gravity the film flows downward and into the receiver 70.

Heat supplied to the film from the heating jacket 14 generates vapors which rise upward under the pulling action of the vacuum means connected to the vapor outlet 30 or the stream of inert gas entering through inlet 71, through the channels formed between adjacent agitator blades 55, through the passage 65 formed between the helical ribbon 60 and the rotor shaft 51, and into the separator chamber 2. Here the vapors are contacted by the rotary blades 23 and, under the influence of centrifugal force produced by the rotation of the blades in concert with the rotation of the agitator blades 55, liquid entrained in the vapor or gas entering separating chamber 2 or formed by condensation in that chamber is moved outward into contact with the separator fins 24 which serve to collect the liquid and drop it back into the evaporator chamber 1.

The sudden reduction of pressure which the feed material undergoes as it enters the feed-supply chamber causes the formation of foam which the rising vapors tend to carry into the separator chamber 2. This is prevented by the action of the rotary helical ribbon 60 which breaks the foam, releasing the vapors to rise through passage 65 while containing the viscous liquid in the feed-supply chamber and positively displacing it downward toward the agitator blades by which it is forced onto the heated evaporator surface 12. Thus the helical ribbon 60 churns the foam and returns liquid material contained in it back to the heated surface 12 where it combines with the falling film of material being subjected to evaporation.

When employing high viscosity material, the product resulting from the evaporation process is preferably discharged from the evaporator into the receiving vessel 70 in the form of the tubular film resulting from the evaporation procedure. Accordingly, the outlet 69 from the evaporation chamber is of substantially the same cross-sectional area as the surface 12. In the use of the apparatus in connection with materials of lower viscosity, this may not be necessary. Hence while this feature forms a part of the preferred embodiment of the apparatus of the present invention, it is not an essential element of the invention.

The specific dimensions of the apparatus will depend upon a number of factors, and especially the viscosity of the material undergoing evaporative treatment. The rate of flow of the material through the evaporator is controlled by gravity and is dependent upon the viscosity of the material supplied to the apparatus.

Ordinarily the evaporating chamber 1 is more than twice as long as its diameter. A ratio of length/diameter of 4/1 is satisfactory, although a rate of 8/1 has been used, resulting in a somewhat more complete removal of the volatiles.

Similarly, the clearance between the edges 56 of the agitator blades and the heated surface 12 may vary, depending upon the nature of the material being subjected to evaporation. Of the conditions characterizing the process of our invention, the retention of the material in the evaporation chamber and the viscosity of the material undergoing evaporation define for all practical purposes the film thickness in the apparatus. Ordinarily the thicknesses of the film flowing in contact with the heat transfer surface are no greater than about 0.100 inch. The clearances between the heat transfer surface 12 and edges 56 of the agitator blades 55 influence the permissible rate of feed for a given apparatus. Suitable clearances range from 0.010 inch to 0.50 inch, and preferably from 0.010 inch to 0.035 inch.

The speed of rotation of the agitator blades also will be influenced by the nature of the material undergoing evaporation. Ordinarily, for highly viscous material which is liquid at about 250° C. and which has a viscosity exceeding 100,000 centipoises, a peripheral speed of the blade edge 56 of about 5 inches per second to about 60 inches per second is preferred.

In order to substantially prevent the passage of foam upward between the edge 61 of the helical ribbon 60 and the inner surface 12 of the tubular member 11, the clearance between the edge 61 and surface 12 is similarly restricted to a small value, thereby assisting in return of liquid material separated from the foam to surface 12 of the evaporator 11.

The pitch of the helical ribbon 60 can be varied. A suitable pitch is represented by a ratio of diameter of the outer edge 61 of the helical ribbon (diameter of the helix) to vertical length of the helix of 1/1. While a single turn is adequate, other pitches and other lengths of helical ribbon can be used.

For purposes of illustration, the invention will be further described in connection with the removal of monomer and water contained in a nylon-6 polymer (polycaprolactam polyamide) resulting from the polymerization of epsilon-caprolactam in the presence of water. It is to be understood, however, that the invention is not limited to such use and that the process and apparatus can be employed for the separation by evaporation of other volatile components contained in other materials normally solid at atmospheric temperatures which are liquid at temperatures below their decomposition temperature and especially those having a viscosity between 100,000 and 500,000 centipoises and a melting point above 215° C. Parts and percentages are by weight and temperatures are in degrees centigrade.

The caprolactam nylon was obtained by heating epsilon-caprolactam at a polymerization temperature of about 250° in the presence of water. It contained about 10% of equilibrium monomer (epsilon-caprolactam), about 2% of oligomers and about 0.15% of water. Its melting point was about 215° and its metacresol viscosity was 1.6.

The particular apparatus employed had two square feet of heating surface in evaporating chamber 1, a ratio of length to diameter of 8/1, and four vertical agitator blades set at 90° intervals. The clearance between the blade edge 56 and surface 12 was 0.026 inch. The peripheral speed of rotation of the agitator blades 55 was 9 inches per second (angular rotation was 50 r.p.m.).

The polycaprolactam polyamide was charged in molten form to the apparatus through feed line 4. The cylindrical wall 11 of the evaporation chamber 1 was heated to a temperature of about 250°–260° by circulating heated "Dowtherm" liquid through the heating jacket 14 and the apparatus was maintained under a high vacuum (the absolute pressure at the vacuum pump connected to vapor outlet 30 was 0.5–1.5 mm.). The molten polyamide was forced over the inner surface 12 of the heated evaporator section by centrifugal force and simultaneously formed descending fillets on the leading edge 56 of each of the rottor blades 55. The fillets rotated with the blade movement, imparting compressive and rotational force against the film of molten polymer at the heat transfer surface causing the film to combine with the fillets, and the liquid polymer which was distributed evenly as a thin film descended along the surface 12, traveling through the heated section of the evaporator and out into receiver 70 in the form of a thin film. The residence time of the polyamide in the apparatus was 72 seconds. The temperatures in chambers 2 and 3 and receiver 70 were at least about 225° C. to prevent polymer from solidifying. Operation was continued in this manner for 4 hours without any difficulty being encountered due to foaming or otherwise. Vapor leaving the outlet 30 was further treated in the conventional way to recover monomer and small amounts of oligomer.

The resulting polycaprolactam polyamide collected in the receiver 70 contained 0.23% of monomer and <0.05% of water. Its oligomer content was 2.3% and its metacresol viscosity was 1.74. It was directly usable as feed for spinning, casting, and the like.

Thus, the present invention makes possible the rapid and continuous removal of monomer from caprolactam nylon.

We claim:

The process of removing, by evaporation, caprolactam monomer and water contained in a polyamide resulting from the polymerization of epsilon-caprolactam, said polyamide having a melting point of at least about 215° C., a viscosity of at least 100,000 centipoises and a metacresol viscosity of at least about 1.6 which comprises introducing said polyamide to a feed supply chamber of a vertical cylindrical evaporator maintained at a pressure of 0.5 to 5 mm. mercury absolute and comprising from top to bottom a separator chamber, the feed supply chamber and an evaporation chamber, passing said polyamide as a falling film about 0.01 to 0.5 inch thick over and in contact with the cylindrical heat transfer surface of said evaporator heated sufficiently to maintain said polyamide film at a temperautre above 225° C. but below its decomposition temperature whereby caprolactam monomer and water are vaporized, subjecting the free surface of the falling film to the agitating action of vertical blades substantially perpendicular to the free surface of said film and having a vertical edge adjacent to the film and revolving at a linear velocity of at least 5 inches per second transversely to the direction of flow of the film, subjecting the vapors to the action of a rotary helical ribbon which breaks foam, formed in said feed-supply chamber as a result of the pressure drop sustained by incoming polymer feed, said rotary helical ribbon positively displacing polyamide liquid released from said foam downward onto said vertical blades while allowing passage of vapors into said separator chamber to be further freed of entrained liquid by the separating action of additional blades moving in concert with said vertical blades.

References Cited by the Examiner

UNITED STATES PATENTS

| | | | |
|---|---|---|---|
| 2,752,336 | 6/1956 | Boon et al. | 260—239.3 |
| 2,766,193 | 10/1956 | Schneider | 202—236 |
| 2,812,019 | 11/1957 | Rasmussen. | |
| 2,857,962 | 10/1958 | Rogers | 159—6 X |
| 2,927,634 | 3/1960 | Gudheim | 159—6 |
| 2,931,433 | 4/1960 | Mertz | 159—47 |
| 2,939,865 | 6/1960 | Fueg et al. | 260—239.5 |
| 2,992,679 | 7/1961 | Twaddle | 159—2 |
| 3,058,516 | 10/1962 | Brunk | 159—6 |
| 3,067,812 | 12/1962 | Latinen et al. | 159—6 |
| 3,130,108 | 4/1964 | Eckstrom et al. | 159—6 |

FOREIGN PATENTS

| | | |
|---|---|---|
| 1,123,231 | 9/1956 | France. |
| 482,488 | 6/1953 | Italy. |

NORMAN YUDKOFF, *Primary Examiner.*

CHARLES O'CONNELL, *Examiner.*

J. SOFER, *Assistant Examiner.*